United States Patent
Black et al.

(10) Patent No.: US 6,459,949 B1
(45) Date of Patent: Oct. 1, 2002

(54) SYSTEM AND METHOD FOR CORRECTIVE ACTION TRACKING IN SEMICONDUCTOR PROCESSING

(75) Inventors: Hang T. Black, Austin, TX (US); Arturo N. Morosoff, Austin, TX (US); Joseph Lebowitz, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/176,537

(22) Filed: Oct. 21, 1998

(51) Int. Cl.[7] .............................................. G06F 19/00
(52) U.S. Cl. ........................... 700/121; 700/96; 700/99; 700/104; 700/108; 700/115; 700/117; 707/104; 707/200; 707/205; 702/182; 702/186; 702/84
(58) Field of Search .............................. 700/32, 95, 96, 700/99–104, 108, 109, 110, 111, 112, 113, 114, 115, 116, 117, 121; 702/182–186, 84–85; 707/104, 103, 200, 205, 9, 10, 7

(56) References Cited

U.S. PATENT DOCUMENTS

| | | | | | |
|---|---|---|---|---|---|
| 4,251,858 A | * | 2/1981 | Cambigue et al. | .......... | 700/108 |
| 4,481,599 A | * | 11/1984 | Ootsuka | ....................... | 700/73 |
| 4,807,108 A | * | 2/1989 | Ben-Arieh et al. | ........... | 700/18 |
| 5,105,362 A | * | 4/1992 | Kotani | ........................ | 700/121 |
| 5,121,319 A | * | 6/1992 | Fath et al. | ..................... | 700/83 |
| 5,241,482 A | * | 8/1993 | Iida et al. | .................... | 700/108 |
| 5,408,405 A | * | 4/1995 | Mozumder et al. | ........... | 700/51 |
| 5,539,752 A | * | 7/1996 | Berezin et al. | ............. | 114/724 |
| 5,654,903 A | * | 8/1997 | Reitman et al. | ............. | 700/117 |
| 5,777,901 A | * | 7/1998 | Berezin et al. | ............. | 700/108 |
| 5,801,946 A | * | 9/1998 | Nissen et al. | ................ | 700/95 |
| 5,831,865 A | * | 11/1998 | Berezin et al. | ............... | 700/51 |
| 5,905,650 A | * | 5/1999 | Tsutsui et al. | .............. | 700/110 |
| 5,913,105 A | * | 6/1999 | McIntyre et al. | ............. | 438/16 |
| 5,916,424 A | * | 6/1999 | Libby et al. | ............. | 204/298.6 |
| 5,943,230 A | * | 8/1999 | Rinnen et al. | ............... | 700/117 |
| 5,956,665 A | * | 9/1999 | Martinez et al. | ............ | 702/188 |
| 5,991,699 A | * | 11/1999 | Kulkarni et al. | ............... | 702/83 |
| 6,128,588 A | * | 10/2000 | Chacon | ......................... | 703/6 |
| 6,148,307 A | * | 11/2000 | Burdick et al. | ............. | 707/104 |
| 6,246,472 B1 | * | 6/2001 | Yoda et al. | .............. | 356/237.2 |

* cited by examiner

*Primary Examiner*—Ramesh Patel
(74) *Attorney, Agent, or Firm*—Kevin L. Daffer; Conley, Rose & Tayon P.C.

(57) ABSTRACT

A system and method for recording and addressing out of control (OOC) events in a semiconductor processing line. The method includes steps of (a) opening OOC entries in an OOC database, and (b) working the OOC entries. Opening an OOC entry is performed in response to one or more OOC events in wafer lots being processed in the semiconductor processing line. A lot record addresses an isolated occurrence pertaining to one wafer lot. An issue record addresses a trend of repeated defects or failures. Opening an OOC entry in the OOC database preferably includes assigning and recording an "owner" responsible for addressing the OOC entry. Working the OOC entries includes opening activity records for the OOC entries, receiving user input on corrective measures, and recording the measures in the activity records. The method preferably also includes steps of (c) closing OOC entries after working the OOC entries, and (d) reassigning OOC entries if ownership is transferred for the entries. The system includes (a) a plurality of computer systems, including a plurality of entry terminals, (b) an OOC database coupled to the plurality of computer systems, (c) an OOC interface executing on one or more of the entry terminals and coupled to the OOC database, and (d) an OOC tracking program executing on one or more of the computer systems and coupled to the OOC database and to the OOC interface.

45 Claims, 12 Drawing Sheets

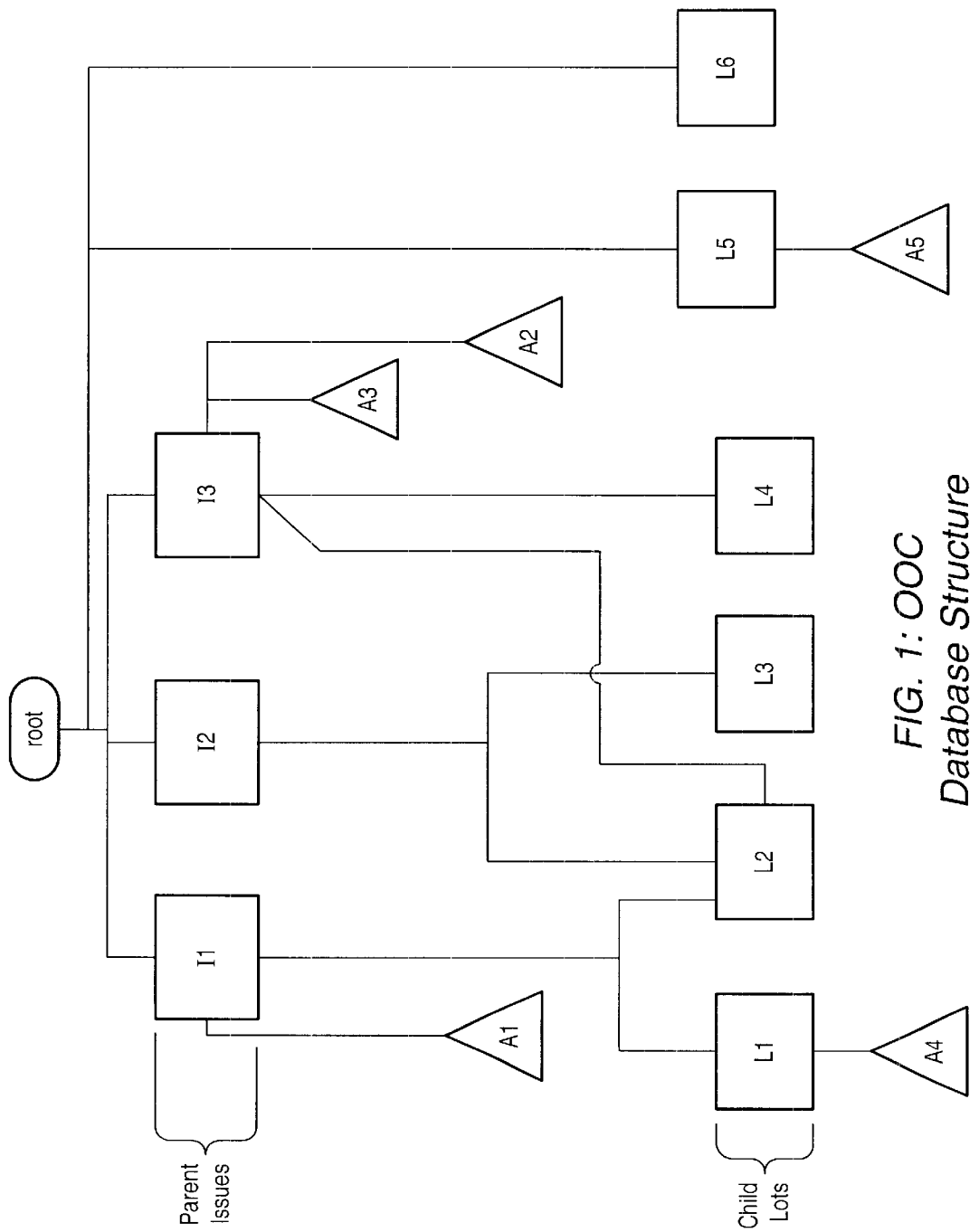
FIG. 1: OOC Database Structure

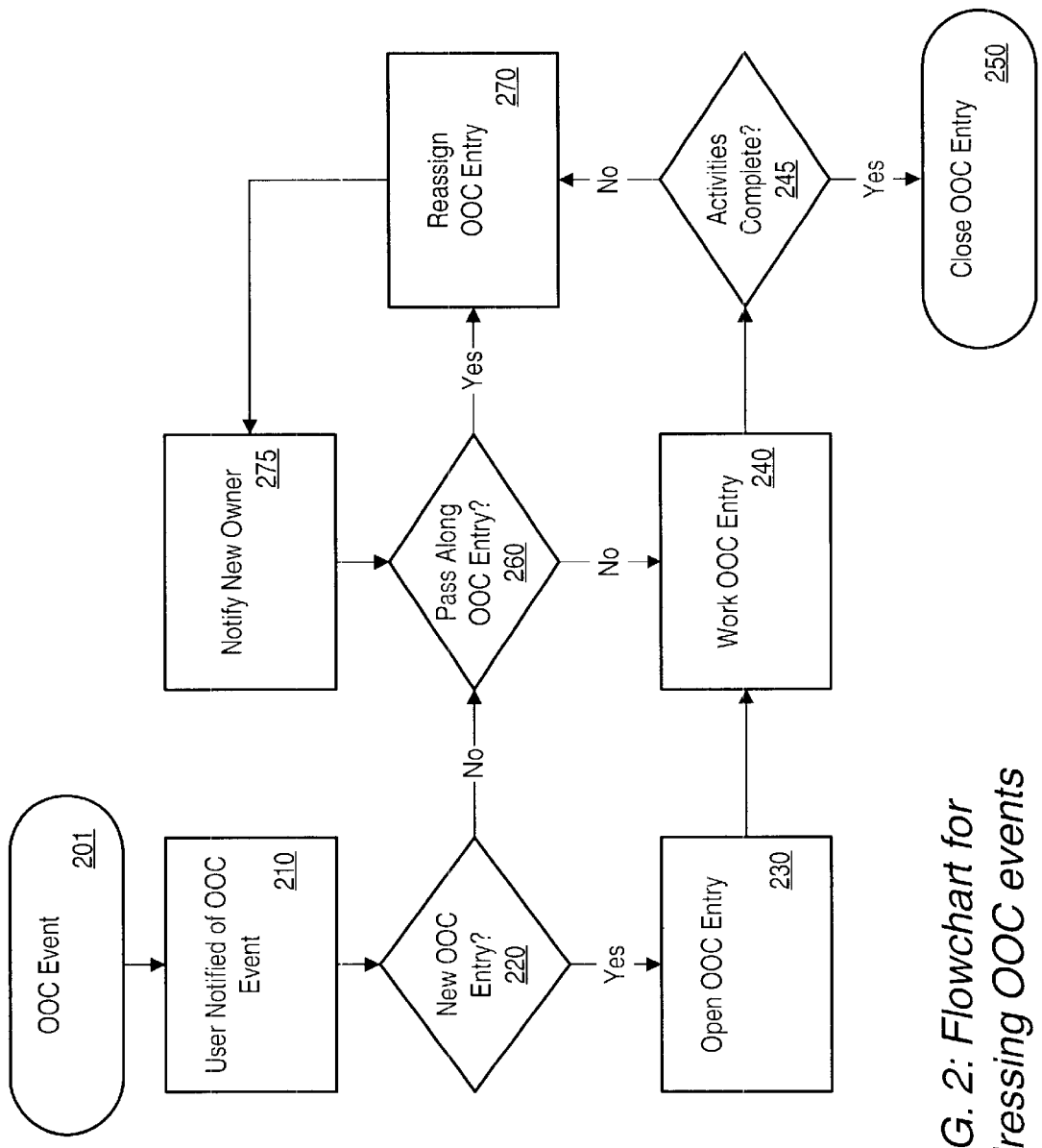
FIG. 2: Flowchart for addressing OOC events

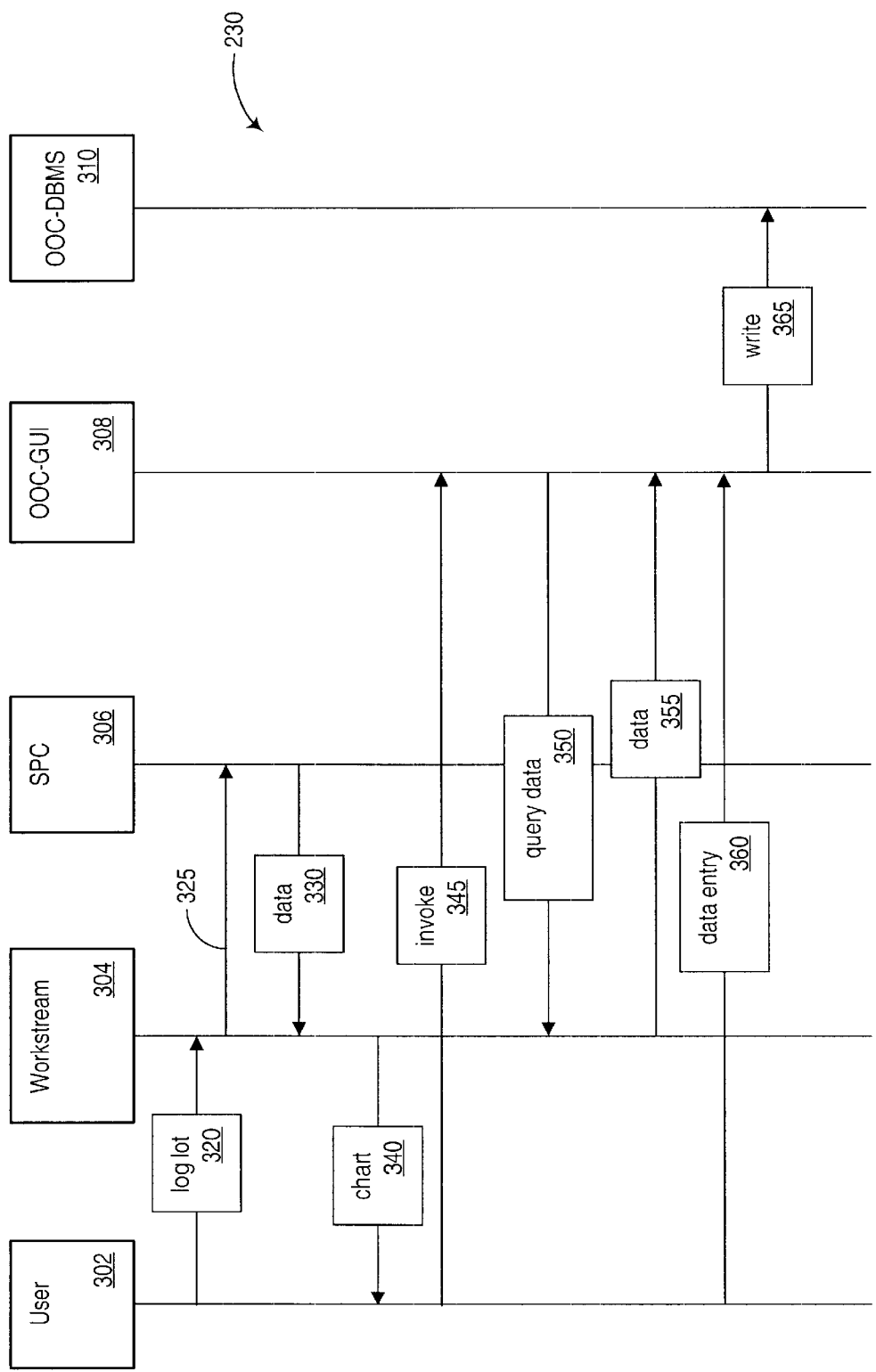
FIG. 3: Opening an OOC Entry

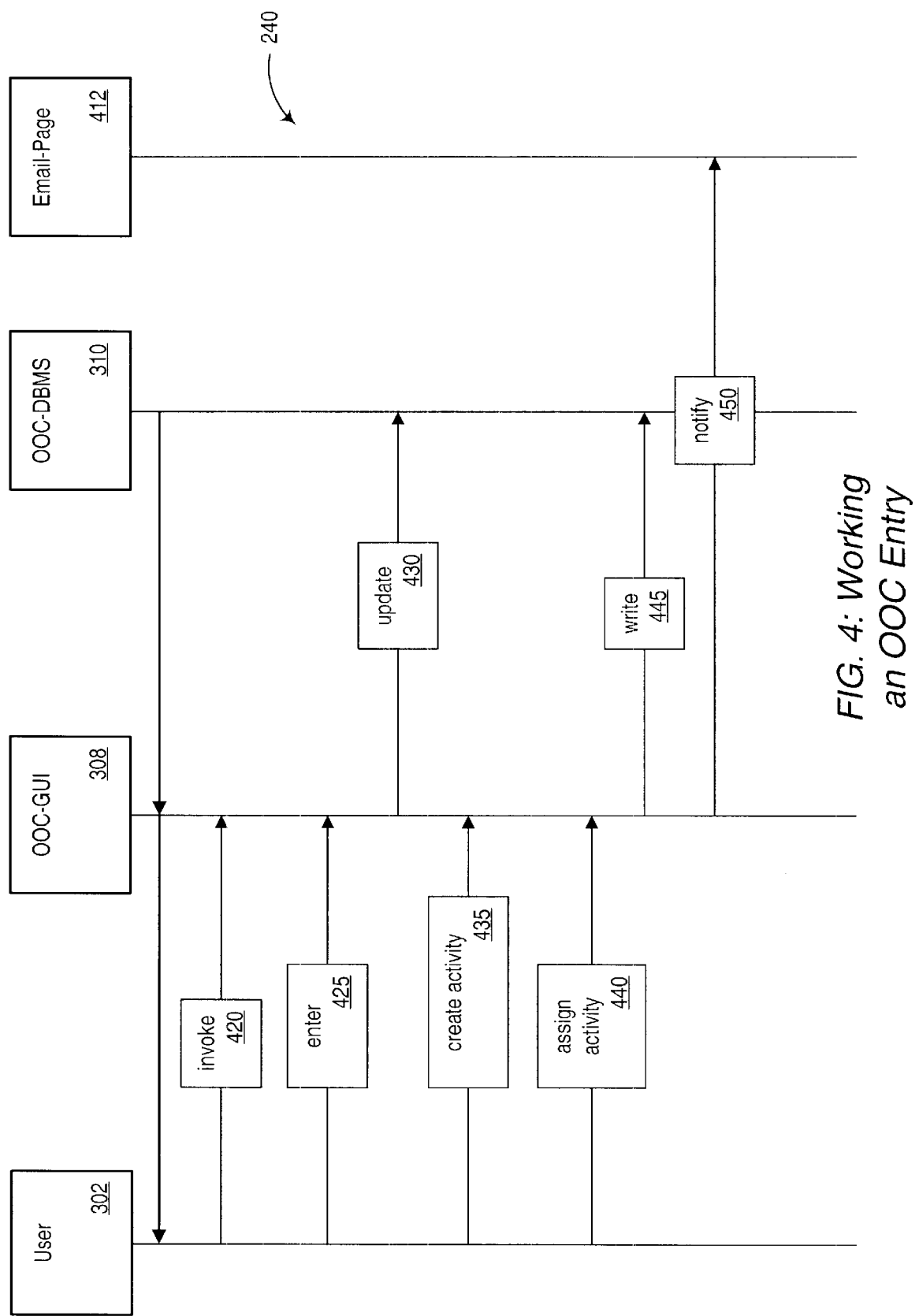
FIG. 4: Working an OOC Entry

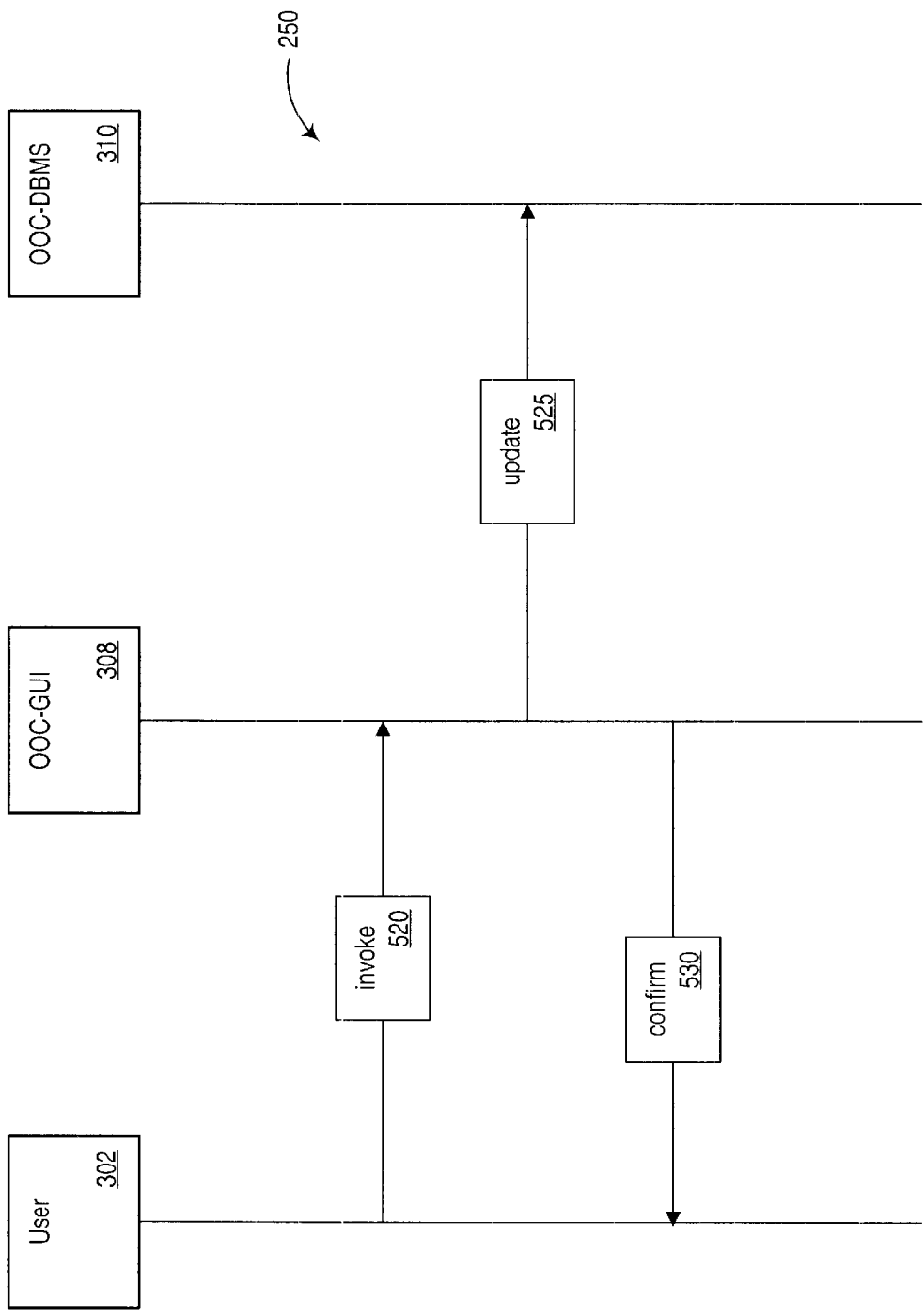
FIG. 5: Closing an OOC Entry

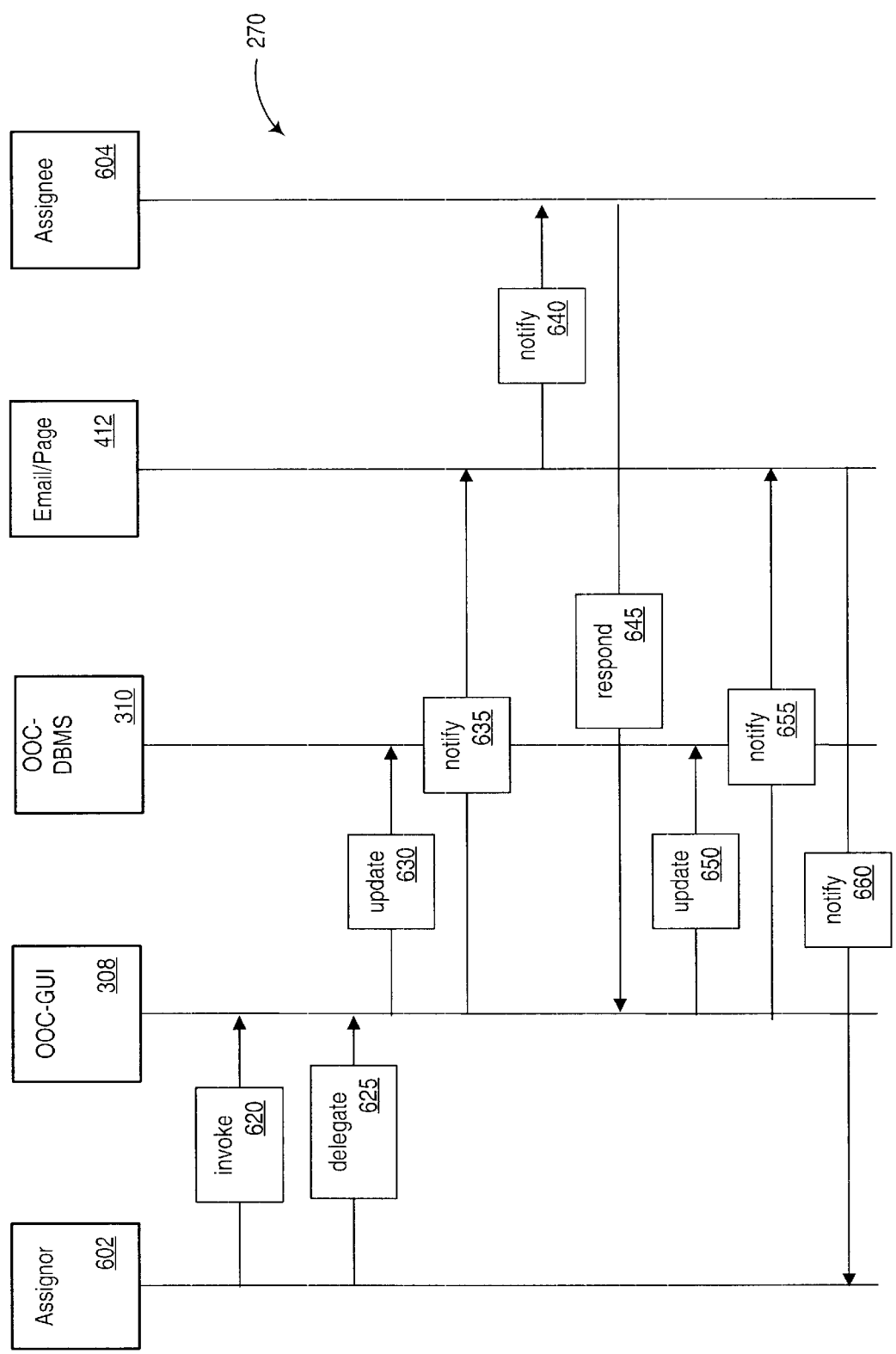
FIG. 6: Reassigning an OOC Entry

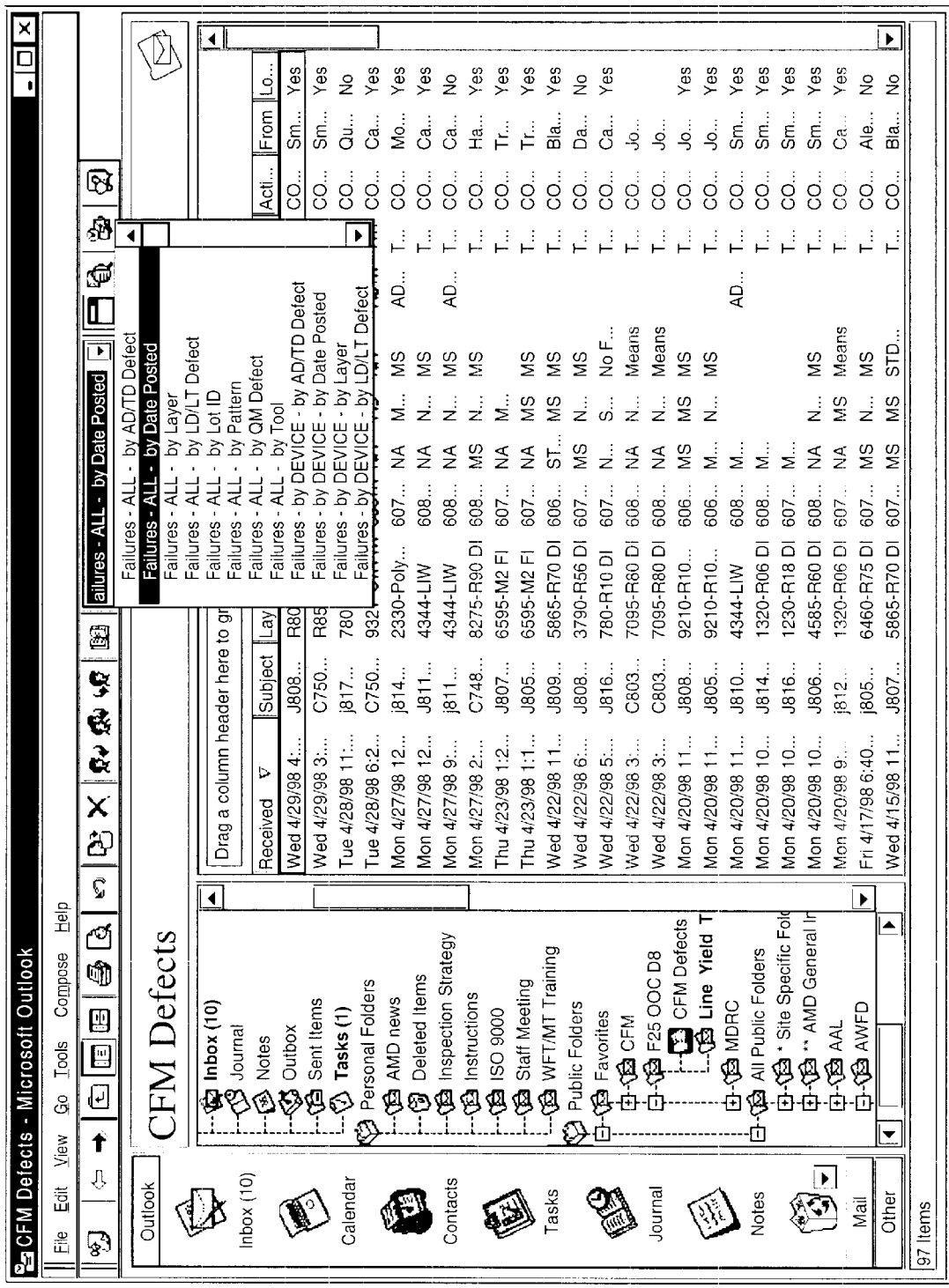
FIG. 7: OOC interface screen.

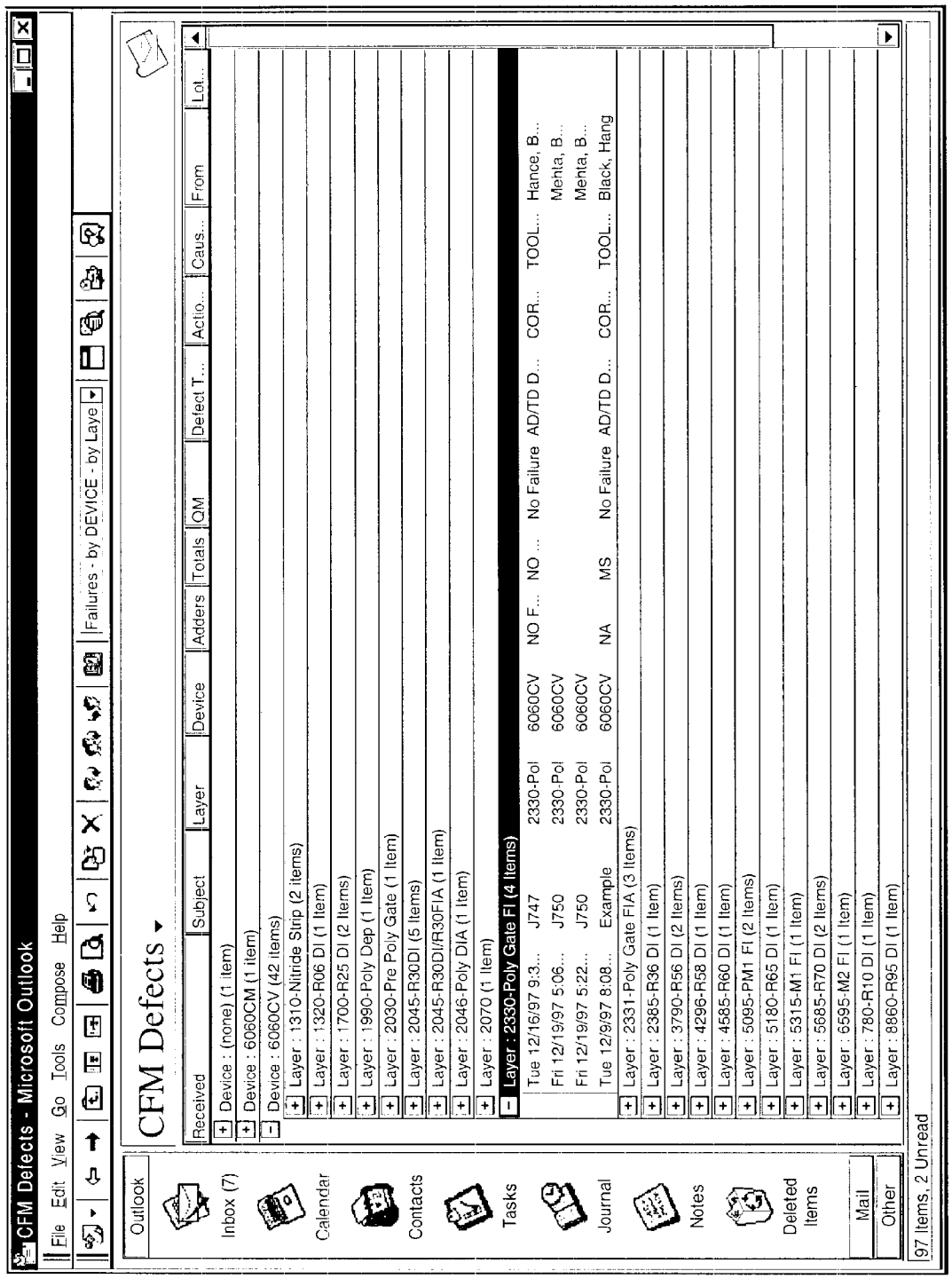
FIG. 8: OOC interface screen with information sorted by device.

FIG. 9: Entry fields for a lot record.

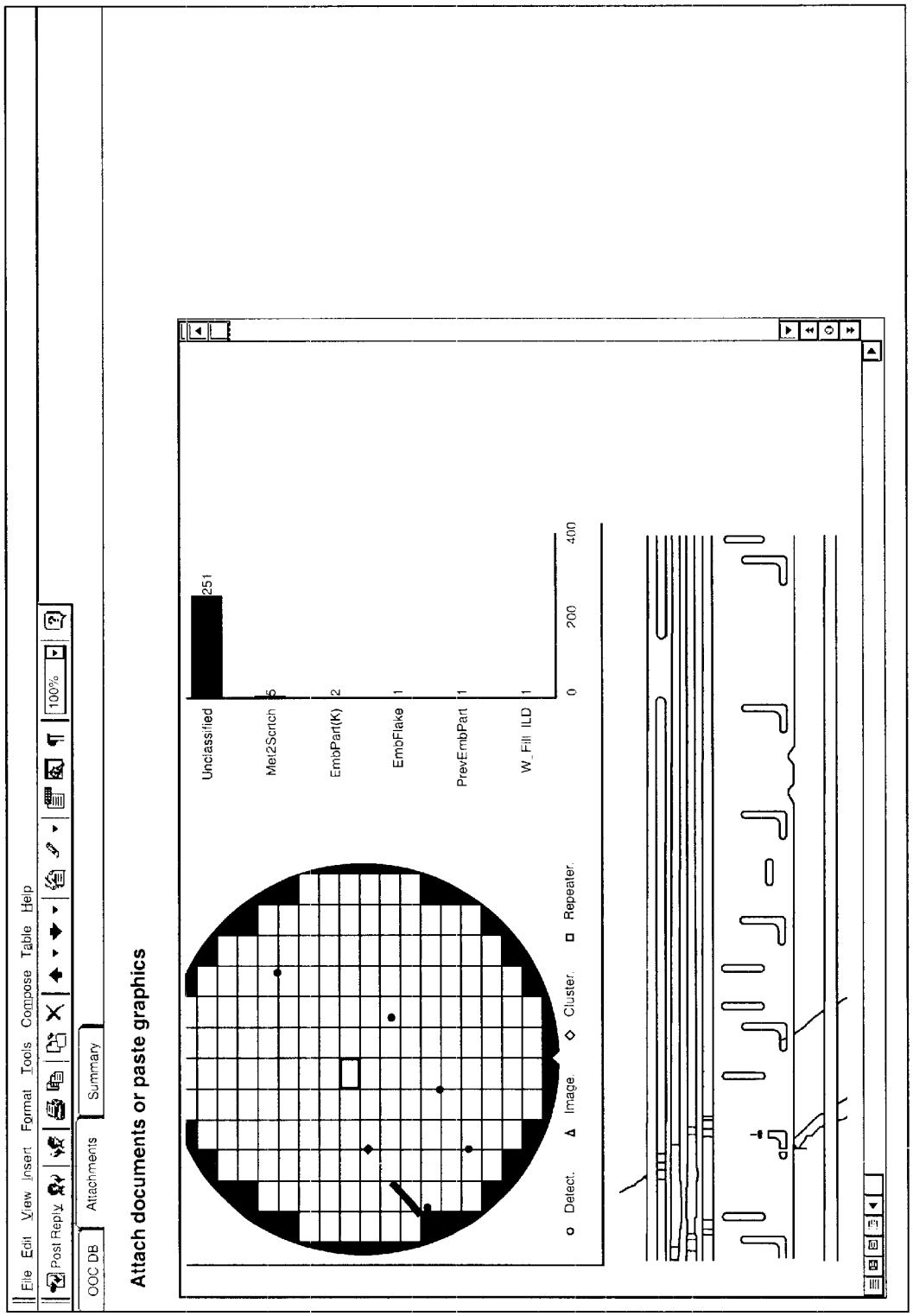
FIG. 10: Attachments in an OOC entry.

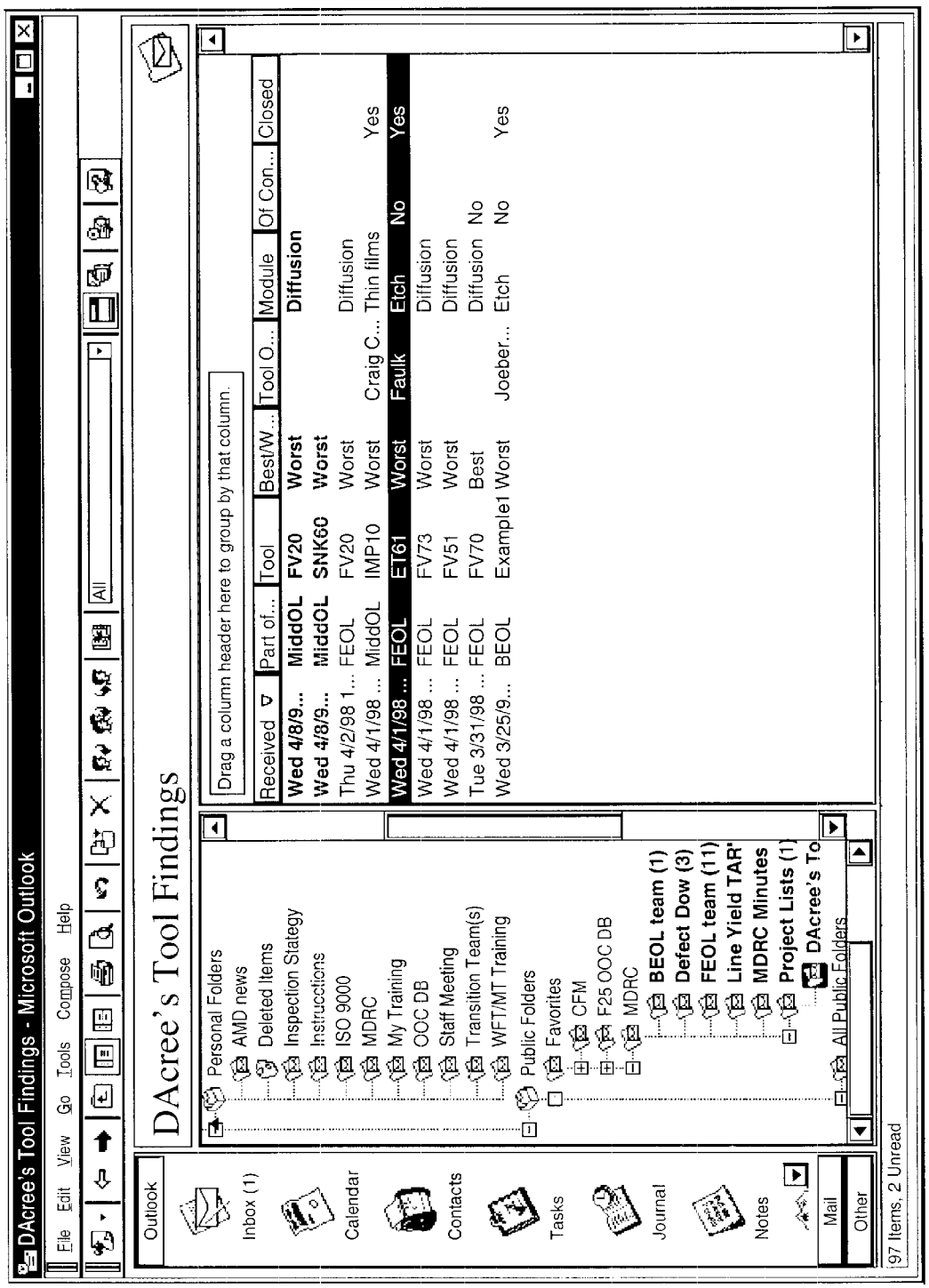
FIG. 11: OOC interface screen for tool studies.

FIG. 12: Summary information for a tool study.

SYSTEM AND METHOD FOR CORRECTIVE ACTION TRACKING IN SEMICONDUCTOR PROCESSING

BACKGROUND OF THE INVENTION

1. Field of the Invention

This invention generally relates to the field of semiconductor processing and more particularly to tracking and addressing manufacturing issues in a semiconductor fabrication facility.

2. Description of the Related Art

Fabrication of an integrated circuit entails the sequencing of numerous processing operations. During the manufacture of an integrated circuit from a bare wafer, various layers of dielectric, polysilicon, and metal are deposited, doped, patterned, etched, and polished to form specific features of the circuit such as gates, interconnects, and contacts. The step in this manufacturing process must be performed with care, since successful completion of each step typically depends on meeting some strict requirements. For example, at some steps in a processing sequence, one or more processing tools are used to modify the wafer to produce the circuit features by exposing the wafer to chemical conditions that must be tightly controlled. The various reactant gasses and solutions must generally be introduced with their constituents in specified ranges of pressures and concentrations, and must be used in particular temperature ranges for controlled durations of time. The lithography steps that introduce patterns for various layers onto the wafer have strict tolerances on the mechanical positioning of the wafer and the optical elements of the lithography tools. The polishing steps typically have a combination of mechanical and chemical requirements for successful operation. Throughout the process, a high degree of cleanliness is required to prevent damage to the wafers, and in effect, a contamination-free environment is required in all steps of production.

Altogether, a semiconductor fabrication line has numerous criteria for the successful production of integrated circuits. When one or more of these criteria is not met, the adverse situation is often observed only by its resulting effects on the wafer. These effects may be apparent in sensitive test structures designed to indicate adverse events in the processing steps, and they may also appear as failed devices on the wafer. An important task in a typical fabrication facility is the recognition and correction of adverse events in the processing steps to prevent the waste of valuable raw materials and unfinished wafers. The adverse events include instances where the mechanical, chemical, thermal, or temporal criteria are not met in the various processing steps, situations where contaminants are inadvertently introduced to the process, and other undesired conditions. The adverse events can arise from equipment failures as well as from inappropriate actions on the part of facility personnel. A great deal of equipment and personnel time is dedicated to detecting and recording the processing errors and other adverse events, but unfortunately, the collected data are often not used as well as they can be.

One reason why diagnostic information is often not fully utilized is that in some cases a previous problem occurs again, but is not immediately recognized as something that has been previously addressed. Thus, time may be wasted "reinventing the wheel" while the correct cause and solution to the problem might be immediately available if the problem were recognized as an old issue.

Another issue is that even when problems are detected at an early stage in the fabrication facility, they are occasionally overlooked until they have a significant impact on the fabrication yield. This oversight often occurs from the lack of delegated responsibility to address the detected problem.

A third problem in the control of errors and other adverse events in the manufacturing process is the sheer volume of information collected about them. Sorting through the copious quantities of test data from a fabrication facility is a daunting task, even with the aid of statistical-analysis software. Much of the test data gathered is of little or no relevance when taken one piece at a time—early recognition of fabrication problems often depends on noting correlated deviations measured at different points in the process. The large amount of gathered data can greatly reduce the practicality of finding such independent corroborating measurements.

These and other problems arise in semiconductor manufacturing facilities trying to address processing errors and other adverse events in their early stages, before the underlying problems run further out of tolerance and cause large amounts of waste that could have been prevented by timely corrective action.

SUMMARY OF THE INVENTION

Presented herein is a method for recording and addressing out of control (OOC) events in a semiconductor manufacturing line. The method includes steps of (a) opening OOC entries, including lot records and issue records, in an OOC database, and (b) working the OOC entries. Opening an OOC entry is performed in response to one or more OOC events in wafer lots being processed in the manufacturing line. If an OOC event is an isolated occurrence pertaining to one wafer lot, a lot record is opened for the OOC event. If, however, the OOC event indicates a trend of repeated defects or failures, then an issue record is opened for the OOC event. Each issue record may be linked to one or more related lot records. Opening an OOC entry in the OOC database preferably includes assigning and recording an "owner" responsible for overseeing measures for addressing the OOC entry.

Working the OOC entries comprises (i) opening activity records in the OOC database, each of which is associated with an OOC entry and includes one or more corrective measures for the associated OOC entry, (ii) receiving user input on corrective measures for addressing the OOC events, and (iii) recording the measures in the activity records. Each activity record preferably indicates the status of corrective measures recorded therein. The method preferably also includes steps of (c) closing OOC entries after working the OOC entries, and (d) reassigning OOC entries if ownership is transferred for the entries.

This disclosure also describes a system for recording and addressing OOC events in a manufacturing line. The system comprises: (a) a plurality of computer systems, including a plurality of entry terminals for entering information on OOC events, (b) an OOC database coupled to the plurality of computer systems, (c) an OOC interface executing on one or more of the entry terminals and coupled to the OOC database, and (d) an OOC tracking program executing on one or more of the computer systems and coupled to the OOC database and to the OOC interface.

The OOC database is configured to store OOC entries and activity records for addressing the OOC entries. The OOC interface is operable to receive new OOC information, to receive measures for addressing OOC events, and to display information from the lot and issue records. The OOC tracking program is operable to open and modify OOC entries, including lot and issue records, in the OOC database. The OOC tracking program is preferably also operable to close OOC entries after the completion of all measures for addressing OOC events in all the activity records linked to the OOC entries.

Each OOC entry preferably has an ownership field, and the tracking program is operable to specify an owner of the OOC entry in the ownership field and to reassign the OOC entry to a new owner.

The disclosure further presents a computer-readable storage medium having program instructions recorded therein for recording and addressing OOC events in a manufacturing line

BRIEF DESCRIPTION OF THE DRAWINGS

Other objects and advantages of the invention will become apparent upon reading the following detailed description and upon reference to the accompanying drawings in which:

FIG. 1 shows a data structure for a database of out-of-control (OOC) events;

FIG. 2 is a flowchart for addressing OOC events;

FIG. 3 is an information-flow diagram for opening an OOC entry;

FIG. 4 is an information-flow diagram for working an OOC entry;

FIG. 5 is an information-flow diagram for closing an OOC entry;

FIG. 6 is an information-flow diagram for reassigning an OOC entry;

FIG. 7 is a view of an OOC interface screen with information sorted by entry date;

FIG. 8 is a view of an OOC interface screen with information sorted by analysis device;

FIG. 9 is a view of an OOC interface showing entry fields for a lot record;

FIG. 10 is a view of an OOC interface screen showing attachments in an OOC entry;

FIG. 11 is a view of an OOC interface screen with information relevant to tool studies; and FIG. 12 is a view of an OOC interface screen showing summary information for a tool study.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Described herein is a system and method for maintaining a database for recording and for responding to manufacturing issues in a semiconductor fabrication facility. These manufacturing issues include concerns in the fabrication line, such as processing errors, tool malfunctions, impurities in the reagent gasses and other reactants, and other issues. In a preferred embodiment, the system and method are used to coordinate assessments and responses to out-of-control (OOC) events observed at monitoring points in the manufacturing process.

FIG. 1 shows the structure of a database for recording wafer defects and other OOC events. The OOC database holds OOC entries, which may be either lot records or issue records, that document wafer defects and other OOC events observed in the fabrication facility. The OOC database also has activity records, which indicate how the OOC events are to be addressed. The activity records are created in response to be OOC entries, and are associated with the OOC entries for which they were created.

Thus the OOC database comprises three types of entries: lot records (illustrated by L1–L6 in the figure), issue records (I1–I3), and activity records (A1–A5). Lot records store information on OOC events in a particular wafer lot. Issue records have information on broader concerns that may affect more than one wafer lot. Actions to be taken in response to these OOC entries are recorded in activity records. Starting from the root of the database shown in the figure, the top level comprises a number of issue records and lot records. Issue records I1, I2, and I3, and lot records L5 and L6 are top-level entries in the database. Lot records L1 through L4 are for lots affected by the issues listed in issue records I1 through I3.

Generally speaking, lots that are associated with a particular issue are called "child lots", and the corresponding issue is called a "parent issue." A particular lot may be affected by more than one issue, as indicated by lot record L2 in the figure, which is a child lot for issues I1, I2, and I3. Lot records L5 and L6 are examples of independent lot records, not associated with any parent issues. As illustrated in the figure, each activity record may be associated with a particular lot, as in the case of activity record A4 associated with lot record L1. Alternatively, the activity records may address a larger issue that may affect more than one lot, as in the case of activity record A1 associated with issue record I1.

A flow chart for one embodiment of a method for addressing OOC events is shown in FIG. 2. Upon the occurrence of an OOC event 201, an appropriate diagnostic tool or an analysis step notifies a user or of the problem in step 210. At that point the user decides in step 220 whether or the OOC event should be entered as a new OOC entry in the OOC database. In another embodiment of the method, the decision in step 220 is performed by an automated monitoring system. If the OOC event has occurred in a new lot (that is, a lot not previously entered in the OOC database), or if the current OOC event has occurred in a prior lot (previously entered in the OOC database) but at new fabrication level in the process, an OOC entry is opened for the OOC event in step 230.

During the opening, the OOC entry is assigned an "owner"—a person responsible for overseeing the resolution of the OOC entry. By designating an owner for each OOC entry, this method ensures that process control issues in the fabrication facility are addressed by responsible personnel. Ownership may be reassigned, that is, a new owner may be designated for an OOC entry, but new owners are duly notified of their new charges. This system of assigning and recording ownership provides several advantages.

Continuity: Ownership is always passed on to another owner, so someone always has responsibility for each OOC entry.

Historical reference: A record is maintained of prior owners, so a user may find out who has previous experience with the OOC entry.

A requirement of minimum entry by each owner: in a preferred embodiment of the method, each owner has to complete at least one corrective measure toward addressing the OOC entry.

Step 240 comprises procedures for working an OOC entry. In step 240, diagnostic and corrective measures for an OOC entry are recorded in associated activity records, and are carried out to address the OOC events. The procedures for opening 230 and working 240 an OOC entry are described below in FIG. 3 and FIG. 4. After an owner has concluded the delegated or assumed activities for the OOC entry, a determination is. made in step 245 of the disposition of the OOC entry. If all the required corrective measures in an activity record are completed, the activity record is closed in step 250. Otherwise, the OOC entry is reassigned in step 270 to a new or previous owner for further working of the OOC entry.

In step 250 the OOC entry is closed after all the diagnostic and corrective measures for the OOC entry have been completed. Specifically, if the OOC record is a lot record, it is closed after all the activity records associated with the lot record are closed. If the OOC record is an issue record, it is closed after all of its associated activity records and lot records are closed, Conversely, in one embodiment of the method, dependent OOC entries may also be closed in response to closing an OOC entry on which they depend. If a lot or issue record is closed because the underlying concern has been addressed, all activity records and lot records subordinate to the lot or issue record are also closed.

Returning now to step 220, if the OOC event is determined to be a repeated observation of a previously recorded OOC entry, then a new OOC entry is not opened for the OOC event. Instead, a decision is made in step 260 whether to continue a previously determined set of activities for the OOC entry, or to pass the OOC entry along to a new owner, for example, an operator who observed the new OOC event. If the OOC entry is not passed along then the new OOC event is preferably recorded in the OOC database and the OOC entry is worked in step 240 according to existing activity records. If the OOC entry is passed along, then in step 270 the OOC entry is reassigned to a new owner. The new owner is notified in step 275 of the ownership. Corrective activities under the new owner are preferably recorded in the OOC database. In an alternative embodiment of the method, reassignment of ownership relinquishes control of corrective actions for the OOC entry, and the corrective activities are not recorded in the OOC database. The procedure for reassigning an OOC entry 270 is described below in FIG. 5.

FIG. 3 is an information-flow diagram describing one embodiment of the procedure 230 for opening an OOC entry. In this embodiment, information is transferred between a user 302, a lot-tracking database 304, a statistical process control (SPC) module 306, an OOC interface 308, and an OOC database 310. In step 320, the user logs information on a wafer lot into lot-tracking database 304. An example of lot-tracking database 304 is the manufacturing software sold under the name WORKSTREAM™. The newly logged information is preferably then provided in step 325 to SPC module 306, which returns statistical analysis data in step 330 to lot-tracking database 304. Summary charts and graphical information are preferably then returned to the user in step 340. If the summary charts indicate that any of the measurements are outside of prescribed tolerances, the user may then invoke in step 345 OOC interface 308 and record the OOC event in an OOC entry. OOC interface 308 is preferably a graphical user interface (GUI) that facilitates data entry by operators in the semiconductor fabrication environment. OOC interface 308 then performs an independent query 350 of the data in lot-tracking database 304. OOC data received in step 355 from lot-tracking database 304 are recorded into the OOC entry, along with additional OOC information received in step 360 from the user. The OOC entry is then recorded in step 365 by OOC interface 308 into OOC database 310. OOC database 310 is preferably an OOC database management system (DBMS).

In FIG. 4 is shown an information-flow diagram for an embodiment of step 240 (from FIG. 2) of working an OOC entry. (For clarity, elements that are the same as in preceding figures retain the same numerical labels here and in subsequent figures.) During the working of an OOC entry, information on the OOC entry, the status of corrective activities, and analysis information generated by the corrective activities are shared among the user 302, OOC interface 308, OOC database 310, and a notification system 412. In steps 420 and 425, the user invokes OOC interface 308 and enters identifying information and other relevant data on the OOC entry. OOC interface 308 updates OOC database 310 in step 430. In this step, information such as pattern distributions of defects and other OOC events, failure modes, testing conditions, and other data are recorded in OOC database 310. This updating 430 may be either by manual entry through OOC interface 308, or through an automated recordation, or through a combination of both. In steps 435 and 440 the user uses OOC interface 308 to create a new activity record for the OOC entry and to assign activities for the OOC entry to one or more owners. The activity records are written to OOC database 310 in step 445, and the owners are notified in step 450 of the new activities through a notification system 412. An example of notification system 412 is an automated email-paging network that sends an electronic mail to the owners' pagers. Throughout this process, the user may receive stored information on the OOC entry through links 460 and 465, in which stored information is provided from OOC database 310 to OOC interface 308, and is made available from OOC interface 308 to the user.

One embodiment of the procedure for closing an OOC entry (step 250 in FIG. 2) is illustrated by the information-flow diagram in FIG. 5. After the user 302 invokes OOC interface 308 in step 520 to indicate the completion of corrective measures in one or more activity records, OOC interface 308 updates OOC database 310 in step 525 to close the activity records. If this closing of activity records leaves no open activity records for a particular lot record, then the lot record is also closed by OOC interface 308. And if the closing of other particular lot record leaves no open lot records for a particular issue record, then the issue record is also closed by OOC interface 308. The closings of the records is confirmed for the user by OOC interface 308 in step 530.

FIG. 6 illustrates one embodiment of the procedure for reassigning an OOC entry (step 270 from FIG. 2). As shown in this figure, the reassigning of an OOC entry comprises a transfer of information among an assignor 602, OOC interface 308, OOC database 310, notification system 412, and an assignee 604. Assignor 602 invokes OOC interface 308 and delegates a lot record to a new owner, assignee 604, in steps 620 and 625. OOC interface 308 updates OOC database 310 in step 630 and notifies the new owner 604 through notification system 412 in steps 635 and 640. Upon receiving notification of assignment as a new owner of an OOC entry, assignee 604 acknowledges the ownership by responding to OOC interface 308 in step 645. OOC interface 308 then updates OOC database 310 with the confirmation of the new ownership in step 650, and notifies assignor 602 through notification system 412 in steps 655 and 660.

FIG. 7 is representative view of a display generated by OOC interface 308. This display shows OOC entries sorted according to the date on which they were received in OOC database 310. As shown, the interface screen may be implemented in a GUI software package such as the one sold under the name OUTLOOK™. In other embodiments of OOC interface 308, the OOC interface screen is created by dedicated software implemented specifically for OOC interface 308. The OOC interface screen preferably lists the OOC entries stored in OOC database 310 and briefly displays information stored in the various fields of the each OOC entry. The display of OOC entries may preferably be sorted according to data contained in the various entry fields, such as:

- the date the OOC entry was received in OOC database 310 (as shown in FIG. 7),
- the total number of defects on a wafer, per unit area (TD defect density),
- the number of additional defects accumulated on a wafer since a prior measurement, per unit area (AD defect density),
- the type of defect being observed in a given TD/AD measurement (AD/TD major defect type) or
- the "Quality Measure" (QM), which indicates the number of die with clusters of defects,
- the posting date of the OOC entry,
- the layer in which the OOC event was detected,
- the lot identification number,
- the pattern in which the defect was detected, or
- the fabrication tool in which the OOC event occurred.

FIG. 8 is a representative view of an OOC interface screen showing OOC entries sorted by the device that observed the OOC events, and then by the layer in which the OOC events occurred. The GUI interface allows further information to be displayed when a particular OOC entry or field is selected by the user.

Figure 9:
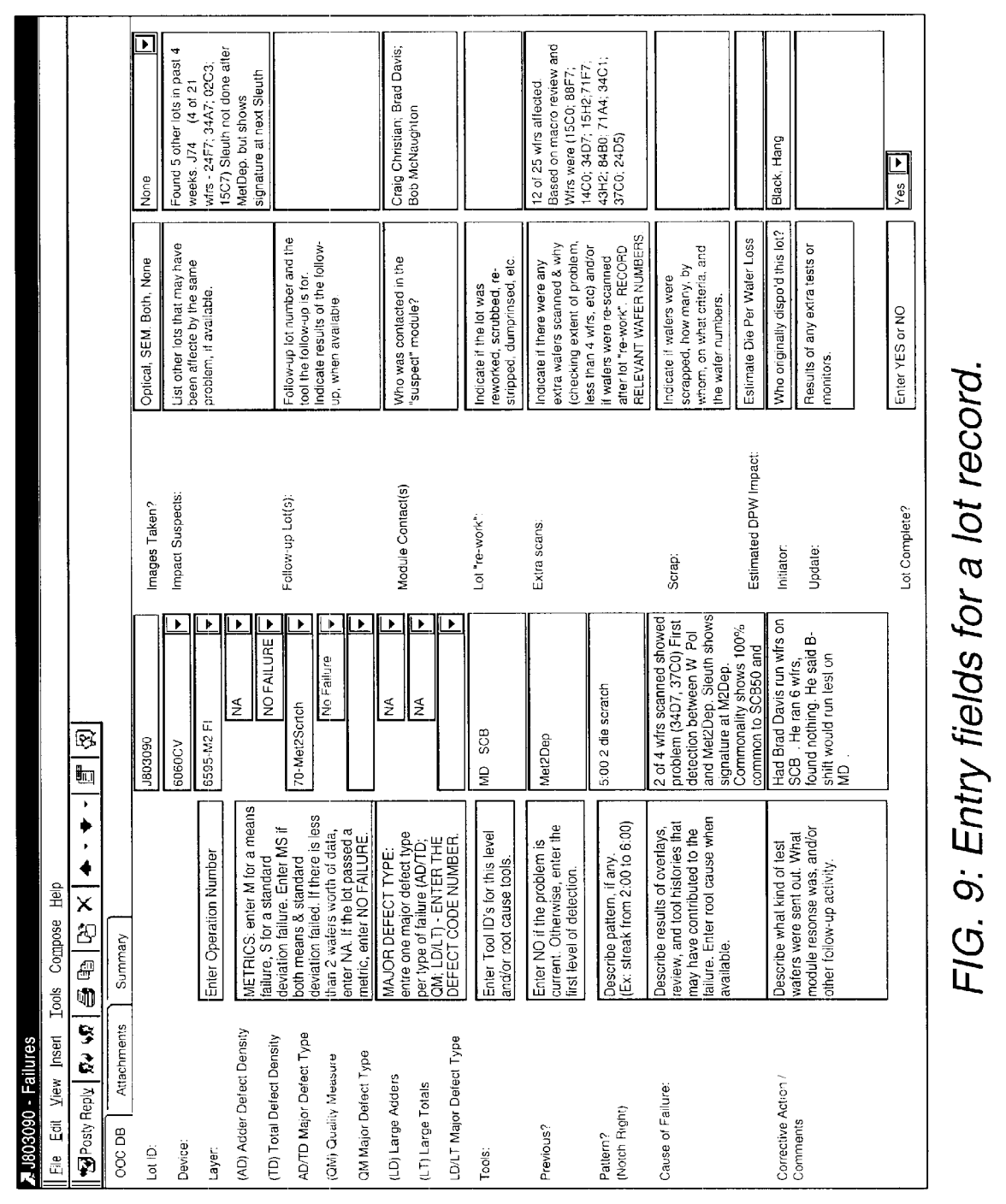

A representative view of an information-entry screen for OOC interface 308 is shown in FIG. 9. In FIG. 9, OOC interface 308 provides entry fields in which a user may enter information about an OOC event to create a new OOC entry in OOC database 310. Shown by way of example are a number of fields relevant to the OOC event, including:

- the lot identification number,
- the device on which the OOC event was detected (which type of memory, logic unit, or processor),
- the layer of the wafer in which the OOC event was detected,
- AD/TD defect densities,
- AD/TD major defect type,
- "large totals"—the total number or density of defects with a size greater than a cutoff size,
- "large adders"—the number or density of additional defects with a size greater than a cutoff size accumulated since a prior measurement,
- the quality measure,
- the tool or tools used in processing the wafer lot prior to observation of the OOC event,
- any previous history of similar OOC events,
- any relevant observed pattern for the OOC event,
- any known cause of failure for the tool,
- corrective actions that were taken or other comments,
- brief descriptions of any images taken of the wafer,
- a list of any other lots of suspected to be affected by the same problem,
- a list of any lots with which the OOC event may be followed up,
- names of contact people consulted regarding the OOC event,
- follow-up information on what happened to be wafer lot,
- any extra scans or testing performance on the wafer lot,
- any history of wafers that were scrapped as a result of the OOC event,
- the estimated die-per-wafer loss resulting from the OOC event,
- the initiator (the person who originally indicated he OOC disposition of the lot), and
- updates, including results of any extra tests or monitoring of the lot, and an indication of whether or not the lot fabrication was completed.

The example information entry screen in FIG. 9 shows a selection tab for "attachments." Selecting this tab provides a user with a view a shown in FIG. 10, which is a representative view of an entry screen for attachments to an OOC entry. As shown in the figure, additional documents or graphics may be inserted in this screen for association with the OOC entry. These attachments may include images of wafers displaying OOC defects, data files produced by analysis devices, or other relevant information for the OOC entry. In another embodiment, the information entry screen has another tab for a view where raw data may be entered.

It is noted that the methods and systems described herein may be used to record and address adverse events in the fabrication facility; their scope is not limited to OOC events. FIG. 11 shows how OOC interface 308 may be used to receive information for tool studies. Since OOC entries may be sorted according to the tool that led to an OOC event or other adverse event, information may be obtained on each tool regarding its history for causing adverse events. In various embodiments of OOC interface 308, the attached information may be added manually (by the user) or automatically (by a tool that generates the attached information or pictures). Additionally, a user may choose between attaching either a copy of the additional information or a link to an appropriate file on in another database.

Figure 12:
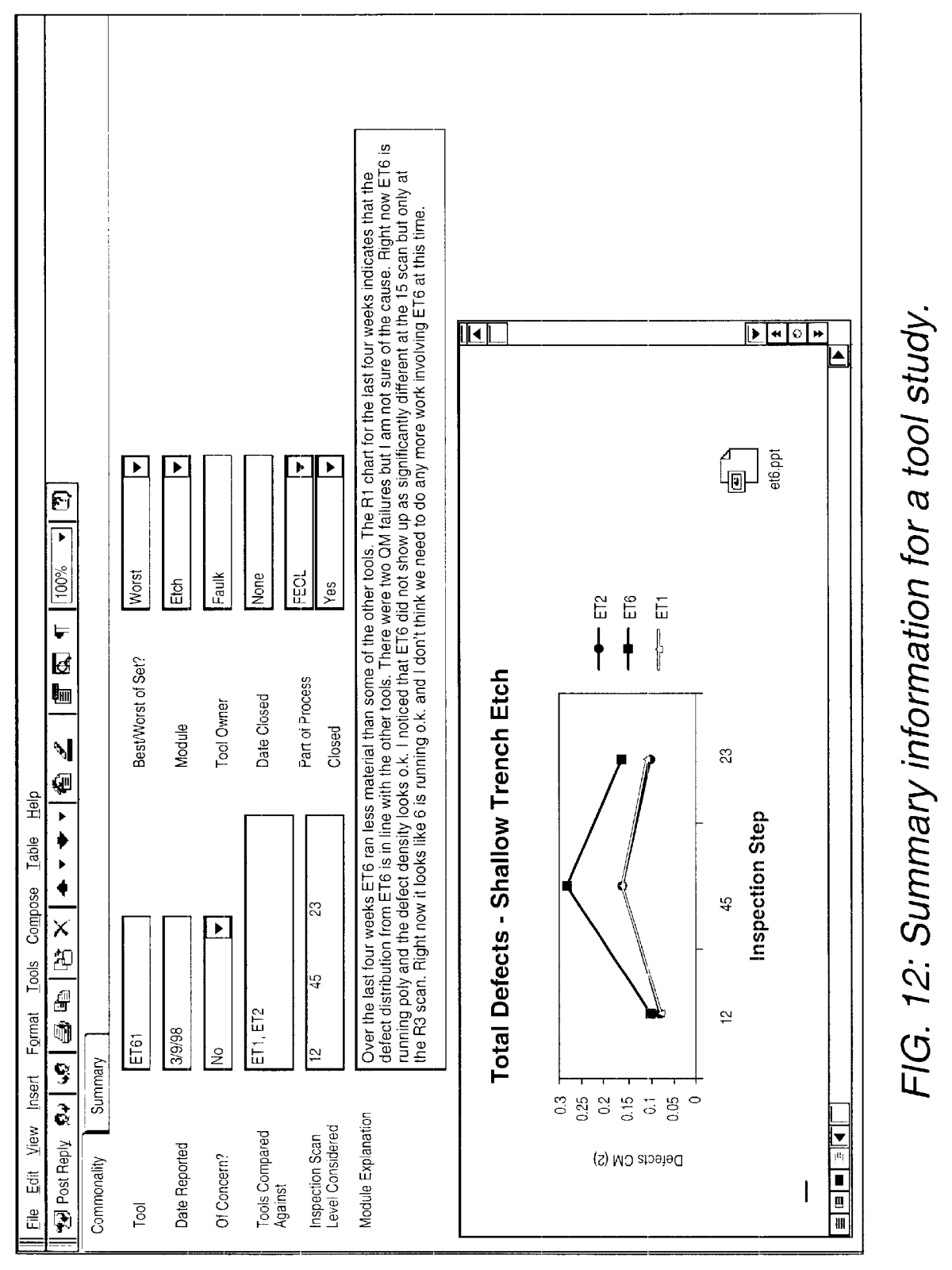

FIG. 12 is a view of a report screen summarizing information for a tool study. Information entered by a user may be presented in such a screen for rapid dissemination and analysis by other users. In this view, the report screen presents:

- which tool is being studied,
- the date of the report,
- a recorded opinion of whether or not the study raises a new concern,
- other tools used for comparison,
- whether the tool under study was the "best" or "worst" in the comparison,
- at which module in the fabrication line the study was performed,
- the owner of the tool,
- if the study is completed, the date it was closed,
- whether the tool is at the front end, middle, or back end of the fabrication line (FEOL, MiDDOL, or BEOL), whether or not the study is closed, explanations of and comments on the study, and relevant graphs and charts.

The sample report screen in FIG. 12 shows information largely entered by a user. In other-embodiments, some of this information and other information may be entered by automated reporting software.

What is claimed is:

1. A method for correcting out of control (OOC) semiconductor fabrication events that occur within a semiconductor processing environment, the method comprising:

recording said OOC events attributed to respective wafer lots fabricated by the semiconductor processing environment;

linking a set of said OOC events to an issue record, wherein the set of said OOC events have common OOC symptoms; and assigning an issue owner to the issue record for correcting conditions within the semiconductor processing environment responsible for causing the set of said OOC events, wherein the issue owner is responsible for overseeing measures for said correcting conditions.

2. The method of claim 1, wherein said recording comprises opening OOC entries, wherein the OOC entries comprise lot records and issue records, and wherein opening one OOC entry includes:

(i) opening one lot record in an OOC database, wherein the lot record describes an OOC event occurring within one of said wafer lots; or (ii) if the OOC database comprises a plurality of lot records indicating an OOC trend, opening one issue record in the OOC database for the OOC trend, wherein the issue record comprises links to lot records indicating the OOC trend; and the method further comprising:

working the OOC entries, wherein working one OOC entry comprises:

(i) opening one or more activity records in the OOC database, wherein the activity records are each linked to the OOC entry, (ii) receiving user input, wherein the user input indicates measures for addressing one or more OOC events from the OOC entry, and (iii) recording the measures for addressing the one or more OOC events from the OOC entry in the one or more activity records;

wherein each activity record indicates a status of the measures recorded in the activity record.

3. The method of claim 2, further comprising:

closing OOC entries after said working the OOC entries, wherein said closing comprises:

(i) closing a first set of activity records after the completion of the measures for addressing OOC events for the first set of activity records;

(ii) closing a first set of lot records after closing all the activity records linked to the first set of lot records; and (iii) closing a first set of issue records after closing all the lot records and activity records linked to the first set of issue records.

4. The method of claim 2, further comprising:

closing OOC entries after said working the OOC entries, wherein said closing comprises:

(i) closing a first set of issue records;

(ii) closing a first set of lot records linked to the first set of issue records in response to closing the first set of issue records; and (iii) closing a first set of activity records linked to the first set of issue records in response to closing the first set of issue records.

5. The method of claim 2, wherein said opening one OOC entry further comprises specifying an owner of the OOC entry in an ownership field within the OOC entry.

6. The method of claim 5, wherein the owner of the OOC is an initiator of the OOC entry.

7. The method of claim 6, wherein the OOC entry is a lot record and wherein the initiator is a lot owner.

8. The method of claim 6, wherein the OOC entry is an issue record and wherein the initiator is the issue owner.

9. The method of claim 5, further comprising:

reassigning OOC entries, wherein reassigning one OOC entry comprises designating a new owner of the OOC entry through an OOC interface and specifying the new owner in the ownership field within the OOC entry.

10. The method of claim 9, wherein the OOC interface is a graphical user interface.

11. The method of claim 9, wherein said reassigning one OOC entry further comprises:

the OOC interface updating the OOC database with information on the OOC entry, wherein the information on the OOC entry includes the new owner; and the OOC interface notifying the new owner of said reassigning the OOC entry.

12. The method of claim 2, wherein said opening one lot record is performed in response to one or more of:(a) an OOC event in a new lot and (b) an OOC event in a prior lot at a new fabrication level; and wherein said opening one lot record comprises:

logging the OOC event into a lot-tracking database for the semiconductor processing line;

providing information on the OOC event to an OOC interface; and the OOC interface writing information on the OOC event in the lot record in the OOC database.

13. The method of claim 12, further comprising:

performing a statistical analysis of the OOC event; and generating a summary report after said logging.

14. The method of claim 2, further comprising:

performing a statistical analysis of the lot records and issue records in the OOC database; and generating a summary report of the OOC database in response to said performing a statistical analysis of the lot records and issue records in the OOC database.

15. The method of claim 2, further comprising an OOC interface receiving database information concerning the lot from a lot-tracking database.

16. The method of claim 2, further comprising an OOC interface receiving information concerning the lot from a user.

17. The method of claim 2, wherein each lot record comprises two or more of: an owner field, a lot identifier field, a defect type field, a tool field, a cause of failure field, an associated image, and a corrective action field.

18. The method of claim 2, wherein each issue record comprises a link to one or more lot records and one or more of: an owner field, a defect type field, a tool field, a cause of failure field, an associated image, and a corrective action field.

19. The method of claim 2, wherein each activity record comprises:

a list of one or more corrective actions for addressing one or more OOC events.

20. The method of claim 2, wherein each activity record comprises:
a list of one or more corrective actions for addressing one or more OOC trends.

21. A system for correcting out of control (OOC) semiconductor fabrication events which occur within a semiconductor processing environment, wherein said system comprises:
a database, comprising:
entries associated with OOC events apportioned to wafer lots or fabrication issues common among lots; and
activity records that include measures to be taken for correcting the OOC events depending on the fabrication issues to which the OOC events are apportioned;
and a tracking program adapted to selectively record or disregard an individual OOC event as am entry of the database.

22. A system for recording and addressing OOC events in a semiconductor processing line, comprising:
(a) a plurality of computer systems comprising: a plurality of entry terminals for entering information on OOC events;
(b) an OOC database coupled to said plurality of computer systems, wherein said OOC database is configured to store:
(i) a plurality of OOC entries, wherein each OOC entry in said plurality of OOC entries comprises at least one of:
a lot record that describes OOC events for a lot in the semiconductor processing line; and
an issue record that comprises links to lot records that indicates an OOC trend, and
(ii) a plurality of activity records, wherein each activity record said plurality of activity records is linked to one OOC entry, and wherein said activity records indicate measures for addressing OOC events in the linked OOC entry; and
(c) an OOC interface executing on one or more of said entry terminals and coupled to said OOC database, wherein said OOC interface is operable to receive new OOC information, to receive measures for addressing OOC events, and to display information from said lot and issue records; and
(d) an OOC tracking program executing on one or more of said computer systems and coupled to said OOC database and to said OOC interface,
wherein said OOC tracking program is operable to open new OOC entries in said plurality of OOC entries, wherein opening one OOC entry comprises opening a lot or issue record in response to new OOC information from said OOC interface, and
wherein said OOC tracking program is operable to modify lot records and issue records in said OOC database.

23. The system of claim 22, wherein said OOC interface is comprised in said OOC tracking program.

24. The system of claim 22, wherein the OOC interface is a graphical user interface.

25. The system of claim 22, wherein said OOC tracking program is operable to close a first OOC entry in said plurality of OOC entries after the completion of all measures for addressing OOC events in all the activity records linked to said first OOC entry.

26. The system of claim 22,
wherein said OOC tracking program is operable to close a first set of activity records in said plurality of activity records after the completion of the measures for addressing OOC events for the first set of activity records;
wherein said OOC tracking program is operable to close a first set of lot records after closing all the activity records linked to the first set of lot records; and
wherein said OOC tracking program is operable to close a first set of issue records after closing all the lot records and activity records linked to the first set of issue records.

27. The system of claim 22,
wherein said OOC tracking program is operable to close a first set of issue records in response to user input through said OOC interface;
wherein said OOC tracking program is operable to close a first set of activity records linked to the first set of issue records in response to closing the first set of issue records; and
wherein said OOC tracking program is operable to close a first set of lot records linked to the first set of issue records in response to closing the first set of issue records.

28. The system of claim 22, wherein each OOC entry in said plurality of OOC entries comprises an ownership field, and wherein said tracking program is operable to specify an owner of the OOC entry in said ownership field of the OOC entry.

29. The system of claim 28, wherein for each OOC entry in said plurality of OOC entries, said tracking program is operable to specify an initiator as the owner of the OOC entry when opening the OOC entry.

30. The system of claim 28, wherein each OOC entry in said plurality of OOC entries further comprises at least one prior ownership field, and wherein said tracking program is operable to specify one prior owner of the OOC entry in each of said prior ownership fields of the OOC entry.

31. The system of claim 28,
wherein said OOC tracking program is operable to reassign OOC entries, wherein reassigning a first OOC entry in said plurality of OOC entries comprises receiving a new owner of said first OOC entry through said OOC interface and specifying the new owner in the ownership field within said first OOC entry.

32. The system of claim 31, wherein the reassigning said first OOC entry further comprises said OOC interface notifying the new owner of the reassigning said first OOC entry.

33. The system of claim 22,
wherein said OOC tracking program is operable to open a new lot record in response to one or more of: (a) an OOC event in a new lot and (b) an OOC event in a prior lot at a new fabrication level; and
wherein opening said new lot record comprises:
logging the OOC event into a lot-tracking database for the semiconductor processing line;
providing information on the OOC event to said OOC interface; and
said OOC interface writing the information on the new OOC event in said new lot record in said OOC database.

34. The system of claim 33, further comprising:
a statistical analysis program executing on one or more of said computer systems and coupled to said user interface and to the lot-tracking database, wherein said statistical analysis program is operable to generate a summary report after logging the OOC event into a lot-tracking database.

35. The system of claim 34, wherein said statistical analysis program is operable to perform a statistical analysis of the lot records and issue records in the OOC database and to generate a summary report of the OOC database in response to the statistical analysis.

36. The system of claim 22, wherein each lot record comprises two or more of: an owner field, a lot identifier field, a defect type field, a tool field, a cause of failure field, an associated image, and a corrective action field.

37. The system of claim 22, wherein each issue record comprises a link to a lot record and one or more of: an owner field, a defect type field, a tool field, a cause of failure field, an associated image, and a corrective action field.

38. The system of claim 22, wherein each activity record comprises a list of one or more corrective actions for addressing one or more OOC events.

39. A computer-readable storage medium having program instructions recorded therein, wherein said program instructions are operable to implement steps for recording and addressing out of control (OOC) events in a semiconductor processing line, wherein said program instructions implement:

(a) opening OOC entries, wherein the OOC entries comprise lot records and issue records, and wherein opening one OOC entry includes:
  (i) opening one lot record in an OOC database, wherein the lot record describes an OOC event for a lot in the semiconductor processing line; or
  (ii) if the OOC database comprises a plurality of lot records indicating an OOC trend, opening one issue record in the OOC database for the OOC trend, wherein the issue record comprises links to lot records indicating the OOC trend; and (b) working the OOC entries, wherein working one OOC entry comprises:
  (i) opening one or more activity records in the OOC database, wherein the activity records are each linked to the OOC entry,
  (ii) receiving user input, wherein the user input indicates measures for addressing one or more OOC events from the OOC entry, and
  (iii) recording the measures for addressing the one or more OOC events from the OOC entry in the one or more activity records;

wherein each activity record indicates a status of the measures recorded in the activity record.

40. The storage medium of claim 39, wherein said program instructions further implement:
  closing OOC entries after said working the OOC entries, wherein said closing comprises:
    (i) closing a first set of activity records after the completion of the measures for addressing OOC events for the first set of activity records;
    (ii) closing a first set of lot records after closing all the activity records linked to the first set of lot records; and
    (iii) closing a first set of issue records after closing all the lot records and activity records linked to the first set of issue records.

41. The storage medium of claim 39, wherein said program instructions further implement:
  closing OOC entries after said working the OOC entries, wherein said closing comprises:
    (i) closing a first set of issue records;
    (ii) closing a first set of lot records linked to the first set of issue records in response to closing the first set of issue records; and
    (iii) closing a first set of activity records linked to the first set of issue records in response to closing the first set of issue records.

42. The storage medium of claim 39, wherein each lot record comprises two or more of: an owner field, a lot identifier field, a defect type field, a tool field, a cause of failure field, an associated image, and a corrective action field.

43. The storage medium of claim 39, wherein each issue record comprises a link to a lot record and one or more of: an owner field, a defect type field, a tool field, a cause of failure field, an associated image, and a corrective action field.

44. The storage medium of claim 39, wherein each activity record comprises:
  a list of one or more corrective actions for addressing one or more OOC events.

45. The storage medium of claim 39, wherein each activity record comprises:
  a list of one or more corrective actions for addressing one or more OOC trends.

* * * * *